US008910296B2

(12) United States Patent
Rayes et al.

(10) Patent No.: US 8,910,296 B2
(45) Date of Patent: Dec. 9, 2014

(54) DATA PRIVACY FOR SMART SERVICES (75) Inventors: Ammar Rayes, San Ramon, CA (US); Subrata Dasgupta, San Jose, CA (US); Gaurav Garg, Bangalore (IN); Mark Whitteker, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 221 days.

(21) Appl. No.: 13/286,177

(22) Filed: Oct. 31, 2011

(65) Prior Publication Data

US 2013/0111596 A1     May 2, 2013

(51) Int. Cl.
*G06F 21/00*     (2013.01)
*H04L 12/26*     (2006.01)
*H04L 29/06*     (2006.01)
*H04L 12/24*     (2006.01)

(52) U.S. Cl.
CPC ............ *H04L 63/0414* (2013.01); *H04L 43/04* (2013.01); *H04L 41/28* (2013.01); *H04L 41/0213* (2013.01)
USPC ............. 726/26; 713/153; 713/154; 709/223; 709/224

(58) Field of Classification Search
CPC ................................ H04L 63/04; H04L 43/06
USPC ........................................................ 726/26
See application file for complete search history.

(56) References Cited

U.S. PATENT DOCUMENTS

| 2008/0275829 | A1* | 11/2008 | Stull et al. .................... 706/17 |
| 2009/0008441 | A1* | 1/2009 | Montgomery et al. ....... 235/379 |
| 2009/0106262 | A1* | 4/2009 | Fallen et al. .................... 707/10 |
| 2010/0138696 | A1* | 6/2010 | Dehaan et al. .................. 714/37 |
| 2011/0040983 | A1* | 2/2011 | Grzymala-Busse et al. .. 713/189 |
| 2011/0295988 | A1* | 12/2011 | Le Jouan ....................... 709/223 |
| 2012/0079109 | A1* | 3/2012 | Klein et al. ................... 709/224 |
| 2012/0151597 | A1* | 6/2012 | Gupta et al. ................... 726/26 |
| 2012/0272329 | A1* | 10/2012 | Grammer et al. ............. 726/26 |

OTHER PUBLICATIONS

Phua, "Protecting organisations from personal data breaches", Jan. 2009, pp. 13-18.*

* cited by examiner

*Primary Examiner* — Thanhnga B Truong
*Assistant Examiner* — Thaddeus Plecha
(74) *Attorney, Agent, or Firm* — Hickman Palermo Truong Becker et al. LLP; Michael C. Brandt (57) ABSTRACT

Techniques are disclosed for hiding sensitive information from a provider of support services. In one embodiment, a first network device determines that network device information includes non-sensitive data and sensitive data. In response to the determining, the first network device generates mapping data that maps dummy information to the sensitive data. The first network device generates output data that comprises the non-sensitive data and the dummy data and sends the output data to a second network device. In other embodiments, the user may select the network parameters that are sensitive. The first network device may also receive first report data from the second network device that identifies a network problem and includes the dummy data and generate second report data by using the mapping data to replace the dummy information with the sensitive data.

18 Claims, 6 Drawing Sheets

Mapping Data 310

| Actual Hostname (in Customer's network) 312 | Hostname shown by support server portal 314 | Actual IP address (in customer's network) 316 | IP address shown by support server portal 318 |
|---|---|---|---|
| R2D2-Y-001.dcnip.tatooine.com | tatooine-1 | 22.27.61.227 | 10.0.0.0 |
| R9D2-Y-001.dcnip.tatooine.com | tatooine-2 | 22.6.0.202 | 10.0.0.1 |
| R27D2-Y-001.dcnip.tatooine.com | tatooine-3 | 22.21.0.243 | 10.0.0.2 |

DATA PRIVACY FOR SMART SERVICES

TECHNICAL FIELD

The present disclosure generally relates to data communications networks and, more specifically, to data privacy for network services.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A computer network generally includes a number of different network devices. For example, the network may include network infrastructure devices, such as switches and routers, as well as end station devices, such as desktop machines, servers, hosts, printers, fax machines, and others network resources. In order for the computer network to function properly, network administrators monitor the various devices, deploying new devices or upgrading existing ones in the network. In addition, the network administrator is responsible for configuration management of the network and manages distribution of software on the network. Typically, a network administrator employs a network management system to accomplish such tasks.

A network management system (NMS) is a software program, or a combination of hardware and software, that perform tasks related to assisting the network administrator manage the network. The NMS sometimes includes network inventory and analysis tools, such as a network collector, in order to gather information about managed devices on the network. In a typical configuration, a seed file is programmed into the network collector. The seed file identifies network devices for the network collector to track. In order to track the network devices, the network collector routinely logs into devices identified by the seed file to collect hardware inventory, software configurations, and other network device information.

Typically, the network collector gathers the network information via Simple-Network Management Protocol (SNMP) requests and/or Command-Line Interface (CLI) commands. In some instances, the network collector may also be configured to gather system log ("syslog") data. Many network devices are configured to send syslog messages to an event collector, such as a syslog server, in response to specific events. The syslog protocol separates the content of a message from the transport of the message. In other words, the device sending the syslog message does not require any communication from the devices transporting or logging the message. This enables devices, which would otherwise be unable to communicate, to notify network administrators of problems. The syslog standard is documented in Request for Comments (RFC) 3164 and RFC 5424 of the Internet Engineering Task Force (IETF).

The network collector may store the collected data locally on a device executing the network collector or transmit the collected data to a remote location for further analysis. The collected data may then be used to inventory, analyze, and configure network devices. Thus, the network collector helps the network administrator efficiently manage a large number of network devices. An example of a network collector is Cisco Network Collector, commercially available from Cisco Systems, Inc., San Jose, Calif.

Network support services ("smart services") may be used to manage collected data and network devices. For example, Cisco Smart Services, commercially available from Cisco Systems, Inc., support network technologies deployed in a network. Smart services typically analyze network information and generate reports to identify any network issues. A service provider who offers smart services and the owner or operator of a network may have a vendor-customer relationship. Although the smart services may be highly valuable, many users of networks, such as government agencies, financial institutions, and other organizations, are concerned with privacy and are reluctant to send private network parameters outside of their private network, even if these parameters are encrypted. In addition, certain customers, such as banks and some government agencies, may be prohibited by law from sending private network information overseas.

DESCRIPTION OF EXAMPLE EMBODIMENTS

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 Overview
2.0 Structural and Functional Overview
3.0 Providing Data Privacy for Smart Services
  3.1 Configuring the Collection System and Selecting Sensitive Parameters
  3.2 Performing Data Transformations and Hiding Sensitive Information
  3.3 Remapping Sensitive Information
4.0 Implementation Mechanisms—Hardware Overview
5.0 Extensions and Alternatives
1.0 Overview Techniques are disclosed for hiding sensitive information from a provider of support services. In one embodiment, a first network device determines that network device information includes non-sensitive information and sensitive information. In response to the determining, the first network device generates mapping data that maps dummy information to the sensitive information. The first network device then generates output data that comprises the non-sensitive information and the dummy data and sends the output data to a second network device. For example, the first network device may be in a network under analysis and the second network device may be associated with a provider of the support services, such as smart services.

According to an embodiment, the network device information comprises information that identifies a network problem associated with a private network.

In another embodiment, the non-sensitive network device data includes data that identifies a serial number for a network device and the sensitive device data comprises data that identifies a private internet protocol (IP) address of a device on a private network. In another embodiment, the non-sensitive data includes data that identifies non-configurable network device attributes and the sensitive data comprises data that identifies user-configurable network device attributes.

In another embodiment, the first network device receives user input that selects one or more network parameters that are sensitive. Based on the one or more network parameters selected by the user, the first network device determines which of the network device information is the non-sensitive data, and which of the network device information is the sensitive data.

In another embodiment, the first network device receives first report data from the second network device that identifies a network problem and includes the dummy data. The first report data may also include the non-sensitive data. The first network device generates second report data by using the mapping data to replace the dummy information of the first report data with the sensitive information. The first network device then presents the second report data to a user. The second report data comprises the sensitive data. The second report data may also comprise the non-sensitive data.

In another embodiment, the first network device collects the network information from a plurality of network devices on a private network.

In another embodiment, the mapping data is maintained only by the first network device.

In other embodiments, one or more non-transitory computer-readable storage media store instructions which, when executed by a processor, cause performing one or more of the methods described herein.

.2.0 Structural and Functional Overview

According to techniques described herein, network owners or operators, network device customers or other users may receive smart services from service providers without revealing sensitive network information. In some embodiments, sensitive customer data will not leave a customer's data center or private network. Instead, the sensitive information is mapped to dummy information and maintained within the customer's data center or private network, bolstering the security of the sensitive information and reducing the risk of unauthorized access. Encryption or encoding techniques do not need to be utilized to hide the data.

In some embodiments, the customer is able to receive the same level of network support services that the customer would receive if the sensitive information had been sent to the smart service provider. In other embodiments, the hiding of the sensitive information is transparent to the smart service providers, and the backend servers of the smart service providers operate in the same manner as if the sensitive information was not hidden.

Figure 1:
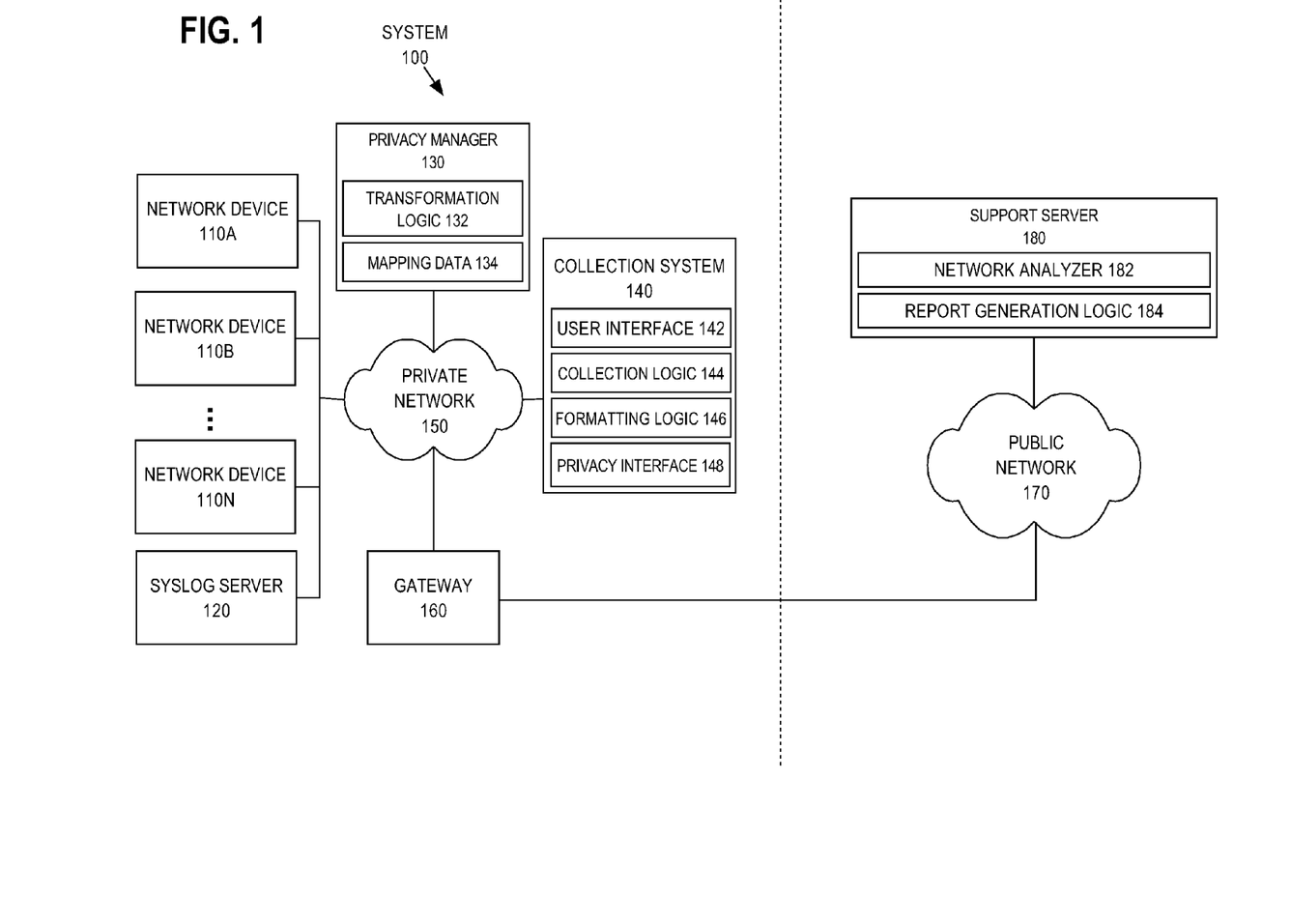
FIG. 1 illustrates a system that provides network support services to a customer network while maintaining data privacy in accordance with an embodiment.

FIG. 1 illustrates a system that provides network support services to a private network while maintaining data privacy in accordance with an embodiment. System 100 generally comprises network devices 110A to 110N, syslog server 120, privacy manager 130, collection system 140, gateway 160, and support server 180. Network arrangements vary from implementation to implementation and the exact network arrangement illustrated in FIG. 1 is not required. The arrangement of FIG. 1 is provided merely to illustrate a clear example.

Network devices 110A to 110N, syslog server 120, privacy manager 130, collection system 140, and gateway 160 are communicatively coupled through private network 150 and implement one or more communications protocols to enable communications over private network 150. Example communications protocols include, but are not limited to protocols of the Internet Protocol suite. Network devices 110A to 110N may be network infrastructure devices, such as a switch or a router, or network endpoint devices, such as a workstation, server, host, printer, fax machine, mobile phone, or other endpoint device. Syslog server 120, privacy manager 130, collection system 140, and gateway 160 may be software, or a combination of software and hardware, and may be executed on one or more of network devices 110A to 110N or any other suitable network device that is part of private network 150. Private network 150 may comprise one or more networks that are controlled or otherwise trusted by a customer and may generally comprise a Local Area Network (LAN), an enterprise network, a customer network, or any other network domain belonging or otherwise associated with the customer. As used herein, customer refers to any identifiable entity, including but not limited to public and private institutions, or person that controls, operates, owns, or is otherwise associated with private network 150.

Syslog server 120 is configured to receive syslog messages from network devices 110A to 110N through private network 150. For example, network devices 110A to 110N may be configured to send syslog messages, as described in RFC 3164 and RFC 5424 of the IETF, in response to a predefined event. Syslog server 120 receives the message from network device and logs the message in a database. In one embodiment, collection system 140 may be configured to act as syslog server 120. Thus, network devices 110A to 110N would send syslog messages directly to collection system 140. Alternatively, syslog server 120 may be implemented on a separate network device, and collection system 140 may be configured to routinely log in to syslog server 120 to collect the syslog data sent by network devices 110A to 110N.

Collection system 140 is configured to facilitate management of private network 150 and includes user interface 142, collection logic 144, formatting logic 146, and privacy interface 148. User interface 142 is configured as a point of interaction between a user, such as a network administrator, and collection system 140. For example, user interface 142 may be a graphical user interface that causes display of interface elements to the user and receives user input to configure operation parameters associated with collection system 140.

Collection logic 144 is configured to gather network information associated with private network 150 and network devices 110A to 110N. The techniques that collection logic 144 uses to gather network information may vary from implementation to implementation. Examples include without limitation collecting network information via Simple Network Management Protocol (SNMP), Command-Line Interface (CLI) outputs, and syslog data. For instance, collection logic 144 may issue SNMP requests to network devices 110A to 110N via private network 150 to collect network information stored as a management information database (MIB). In another example, collection logic 144 may include a secure shell (SSH) client program, a Telnet client program, and/or any other client program to log on to network devices 110A to 110N and retrieve network information.

Example network device information that may be collected by collection system 140 includes, but is not limited to IP addresses, hostnames, serial numbers (SNs), operating system (OS) version data, startup configuration data, running configuration data, and other fault, configuration, accounting, performance, and security data associated with the network devices or the private network. Fault, configuration, accounting, performance and security data are also known as FCAPS parameters.

Formatting logic 146 is configured to process the network information received via collection logic 144 and to generate an output file that includes all or part of the network information. In an example embodiment, once collection system 140 receives the network information, formatting logic 146 processes the network information, such as SNMP MIBs, CLIs and syslog data, to extract and store network device attributes associated with network devices 110A to 110N. The output file may include one or more of the device attributes. The output file may be in any format that is suitable for use by support server 180.

Privacy interface 148 is configured to invoke privacy manager 130 to prevent transmission of sensitive network information to support server 180. In an example embodiment, privacy interface 148 provides the output file to privacy manager 130. Privacy manager 130 is configured to update the output file to hide the sensitive information and to return the updated output file to privacy interface 148.

Privacy manager 130 comprises transformation logic 132 and mapping data 134. Transformation logic 132 is configured to generate and maintain mapping data 134. Transformation logic 132 uses mapping data 134 to hide sensitive information included in the output file. In an example embodiment, privacy manager 130 replaces all sensitive network device attributes with dummy data. Dummy data may comprise any data that acts as a placeholder for the sensitive information in the output data sent to support server 180 and the report data returned by support server 180. In an example embodiment, dummy data identifies fake network attributes, and transformation logic 132 generates two-way mapping data between the fake device attributes and real, sensitive device attributes. Techniques for hiding sensitive information are described in further detail below.

Gateway 160 is a network node that couples private network 150 to public network 170. Accordingly, gateway 160 processes and routes inbound packets from public network 170 to private network 150 and outbound packets from private network 150 to public network 170. Gateway 160 may also be configured to act as a proxy server or a firewall to provide additional security to private network 150. Public network 170 may comprise one or more networks that are part of a network domain that is not trusted by the customer.

Support server 180 comprises network analyzer 182 and report generation logic 184. Network analyzer 182 analyzes the network information sent by a customer to identify any network problems associated with network devices on the private network. For example, network analyzer 182 may match serial numbers of devices with serial numbers on contracts to determine if there are any contracts that are due to expire in the near future. In another example embodiment, network analyzer 182 matches certain network device attributes with product advisories. Report generation logic generates reports based on the network analysis performed by network analyzer 182 and sends the reports to one or more network devices in private network 150.

In one embodiment, each element discussed above and termed "logic" may be implemented in the form of computer program instructions that are stored or recorded in one or more non-transitory storage media and later loaded into the memory of a general-purpose computer or special-purpose computer and executed. Each element of logic may comprise or be represented in the form or content of the electronic digital memory, registers or processors of the computer upon execution of the instructions. In another embodiment, each element discussed above and termed "logic" may be implemented in the form of electronic digital circuit logic using one or more application-specific integrated circuits (ASICs), field programmable gate arrays (FPGAs), or other hardware elements, including those described further herein with reference to FIG. 6.

3.0 Providing Data Privacy for Smart Services

Figure 2:
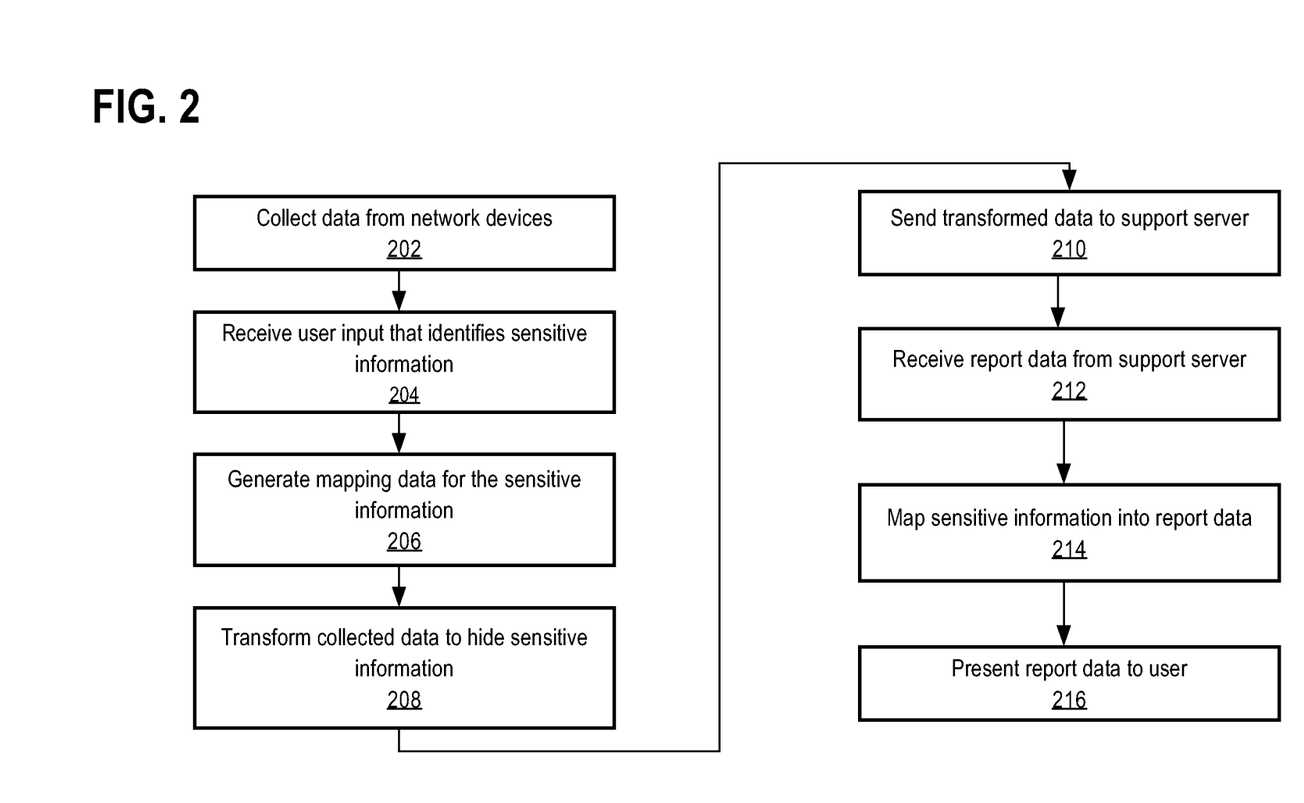
FIG. 2 illustrates an approach for hiding sensitive information in accordance with an embodiment.

FIG. 2 illustrates an approach for hiding sensitive information in accordance with an embodiment. In block 202, a first network device, such as a network collector, collects data from network devices on a private network. Block 202 may involve issuing one or more SNMP requests to managed network infrastructure devices, forming and sending one or more CLI commands to the devices, or obtaining data from one or more databases, directories, or other repositories in the network.

In block 204, the first network device receives input that identifies sensitive information. For example, a user, application program, or other system may identify network parameters that should remain private.

In block 206, the first network device generates mapping data for the sensitive information. In an embodiment, block 206 involves generating dummy data to hide the actual value of a sensitive network parameter. Techniques for generating dummy data are described in further detail below.

In block 208, the first network device transforms the collected data to hide the sensitive information. In an embodiment block 208 involves replacing sensitive information within the collected data with dummy data. For instance, private IP addresses, hostnames, and other device attributes may be replaced in an output file with the dummy information generated in block 206.

In block 210, the first network device sends the transformed data to a support server. Block 210 may involve sending the transformed data over a public network to a non-trusted support server. Because the sensitive parameters have been replaced by dummy data, the sensitive data can remain secure and not be revealed outside of a private network and/or data center.

In block 212, the first network device receives report data from the support server. The reports may identify product advisories, security alerts, contract terms, and other network issues relating to network devices 110A to 110N. More detailed examples of report data are provided below.

3.1 Configuring the Collection System and Selecting Sensitive Parameters

Figure 3A:
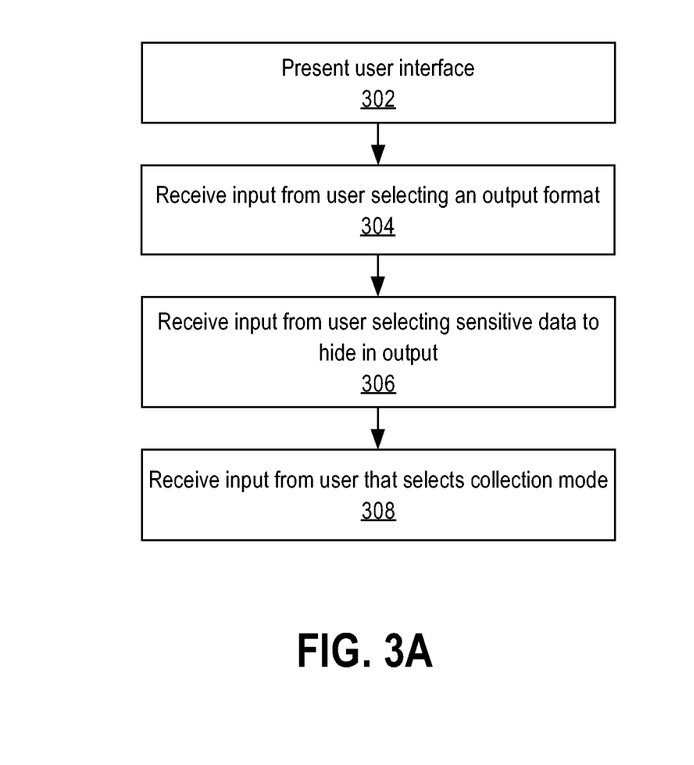
FIG. 3A illustrates an approach for configuring data collection and sensitive parameters in accordance with an embodiment.

In one embodiment, the parameters used for collecting and hiding sensitive network information are configurable by a user, by a computer program or by another system. FIG. 3 illustrates an approach for configuring data collection and sensitive parameters in accordance with one embodiment involving user configuration. In step 302, collection system 140 presents user interface 142 to a user. In an example embodiment, the user interface is a graphical user interface (GUI) that includes display elements that allow the user to configure various parameters associated with the collection system. The display elements may vary from implementation to implementation and may include without limitation elements for configuring output formats, sensitive parameters, and collection modes.

In step 304, collection system 140 receives input from the user, through user interface 142, selecting an output format for the output file. For example, the user may select a particular file format for transformation logic 132 to generate based on the collected data. An example file format includes without limitation a spreadsheet file with each row or each column comprising device attributes for a particular network device. Another example includes a comma separated value (CSV) file format comprising device attributes separated by delimiters.

In step 306, collection system 140 receives input from the user, through user interface 142, selecting the sensitive information to hide in the output that will be sent to support server 180. According to one embodiment, the user may select to hide any network information that has been collected. Alternatively, collection system 140 may limit the device attributes that the user may hide. For example, certain network attributes, such as the device serial number and other attributes that are not user-configurable typically, do not contain private customer information and may be useful for providing network support services. Accordingly, collection system 140 may not allow the user to select some device attributes as sensitive information. Instead, the user may only be permitted to hide user-configurable device attributes.

Figure 3B:
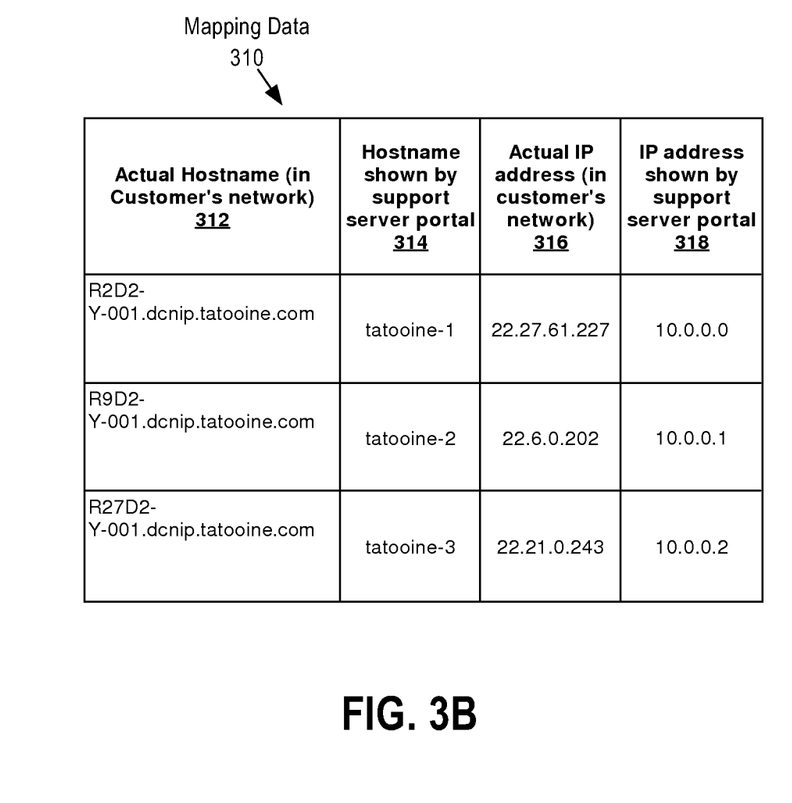
FIG. 3B illustrates example mapping data that is generated to hide sensitive information in accordance with an embodiment.

In one embodiment, the dummy data may be configurable by a user. For example, the user may choose the false hostname "tatooine" and a false starting IP address of "10.0.0.0". In response, privacy manager 130 generates mapping data, such as shown in FIG. 3B and described in further detail below, to hide the sensitive information. In other embodiments, the dummy data may be obtained from a configuration file, obtained from another program or system, obtained from a dictionary or list, or synthesized using a random value generator, obfuscation algorithm, or other approach.

In step 308, collection system 140 receives input from the user, through user interface 142, to select the collection mode of collection system 140. The collection mode may include without limitation on-demand or scheduled collection. If the user selects on-demand collection, then collection logic 144 may immediately begin to collect the network information. If the user selects scheduled collection, then collection logic 144 performs collection of network information at a scheduled time in the future. In another embodiment, the user may also schedule collection at periodic intervals. In response, collection logic 144 performs collection automatically at the intervals specified by the user.

In alternative embodiments, default values may be used for the output format, the sensitive network parameters, and/or the collection mode. For example, collection system 140 may be pre-configured to output a spreadsheet, CSV file or other file format. Collection system 140 may also be pre-configured to hide user-configurable device attributes or other device attributes, and to collect data at predetermined intervals.

3.2 Performing Data Transformations and Hidding Sensitive Data

FIG. 3B illustrates example mapping data that is generated to hide sensitive information in accordance with an embodiment. As illustrated in FIG. 3B, the first column 312 comprises the actual hostname of a network device in the customer's network. The second column 314 comprises a false hostname to which the actual hostname is mapped. The third column 316 comprises an actual IP address of a network device in a customer's network. The fourth column 318 comprises a false IP address to which the actual IP address is mapped. In some embodiments, the concept of a "false" value also includes values that are merely different or substituted and "false" does not necessarily require or imply the use of an invalid value. In some embodiments, each false value actually is an invalid value. False values may be automatically generated using an obfuscation algorithm, random value generator, or other techniques. Examples of generating false values are described in more detail below.

Figure 4:
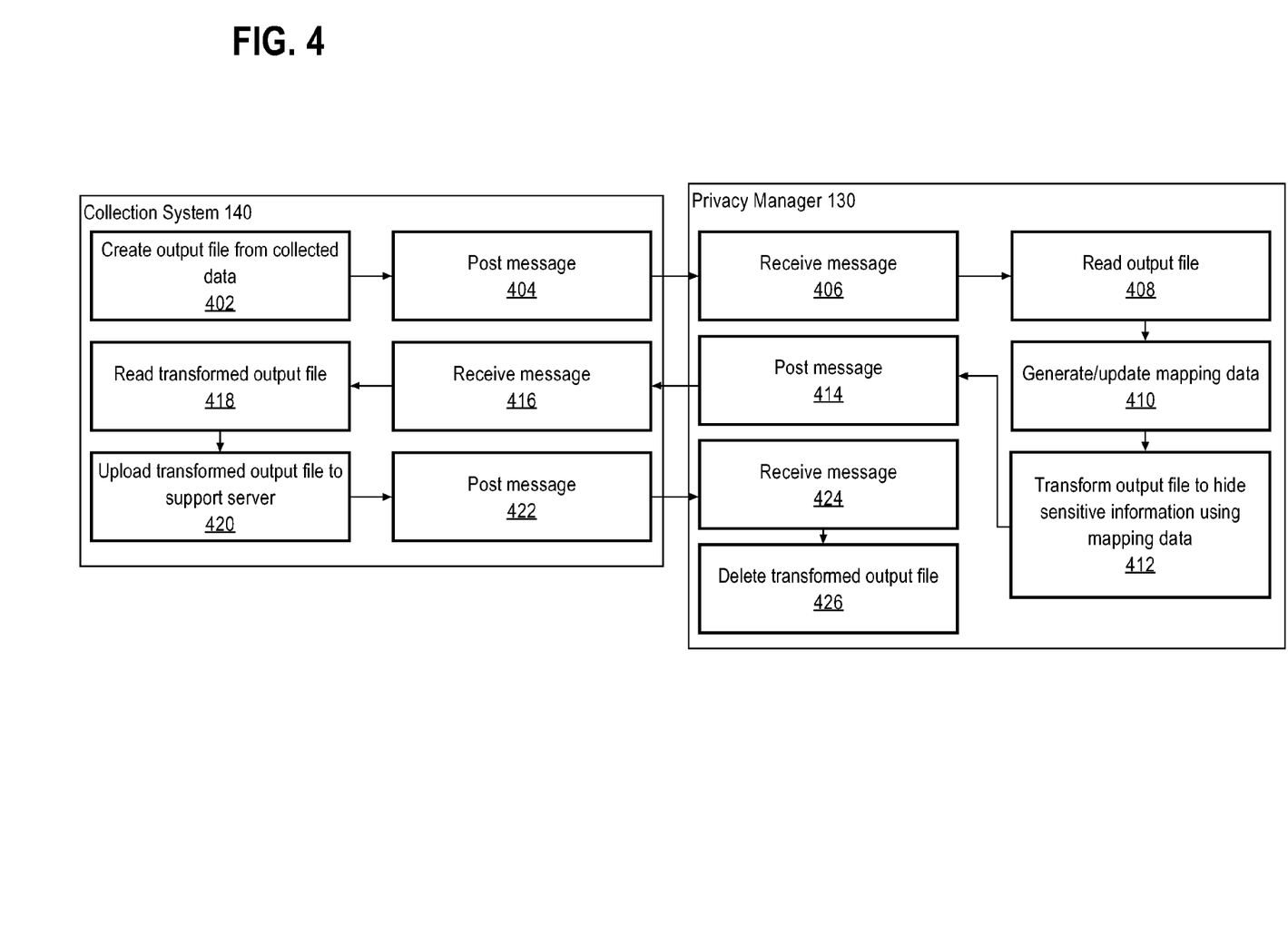
FIG. 4 illustrates an approach for performing data transformations to hide sensitive information from a provider of network support services in accordance with an embodiment.

FIG. 4 illustrates an approach for performing data transformations to hide sensitive information from a provider of network support services in accordance with an embodiment. In step 402, collection system 140 creates an output file from the collected data. For example, the output file may include data that identifies device attribute such as the actual hostnames and IP addresses shown in the first and third columns of FIG. 3B, for one or more network devices on private network 150.

In step 404, collection system 140 posts a message to notify privacy manager 130 that the output file has been created. Any suitable messaging system may be used. An example includes, but is not limited to the Java Messaging Service (JMS). In alternative embodiments, the steps of posting and receiving messages may be omitted, and other steps may be performed entirely by collection system 140 or any other suitable system.

In step 406, privacy manager 130 receives the message that the output file has been created. In step 408, privacy manager 130 reads the output file generated at step 404.

In step 410, privacy manager 130 generates and updates mapping data to map the sensitive information to dummy data. For example, mapping data 310 may be generated as part of this step to hide the actual hostnames and the actual IP addresses of network devices within a private network. In the example embodiment illustrated in FIG. 3B, privacy manager 130 automatically generates the false hostnames based on the dummy data selected by the user by appending a number to the dummy data. The number may be incremented for each subsequent hostname that was collected. For instance, the first actual hostname is mapped to the false hostname of "tatooine-1", the second actual hostname to "tatooine-2", the third to "tatooine-3" and so forth. Similarly, each new IP address may be generated by incrementing the previously mapped false IP address. As shown in FIG. 3B, the first actual IP address is mapped to "10.0.0.0", the second to "10.0.0.1" and the third to "10.0.0.2". Thus, each actual sensitive device attribute is mapped to a unique, false device attribute. In alternative embodiments, other variations to the user-selected false hostname and false IP address may be made. For example, the numbers may be incremented in different patterns or other character or string variations may be used. In alternative embodiments, the dummy data, such as the false hostname and IP address, may be randomly generated or each individual false attribute may be specified by the user.

In one embodiment, privacy manager 130 reads data included in the output file and compares it with existing mapping data, if any, to determine whether mapping data for any of the sensitive information included in the output file has already been generated. If mapping data already exists, then privacy manager 130 uses the preexisting mapping data. If not, then privacy manager 130 generates mapping data for the sensitive information. For example, mapping data for actual hostnames "R2D2-Y-001.dcnip.tatooine.com" and "R9D2-Y-01.dcnip.tatooine.com" may have been previously generated during a prior collection. If a new device is subsequently added to the private network with a hostname "R2D2-Y-001.dcnip.tatooine.com", mapping data for the new hostname may be generated without regenerating mapping data that is already stored by privacy manager 130.

In step 412, privacy manager 130 generates a transformed output file, using the mapping data, to hide sensitive information. For example, if the output file includes hostname, and IP addresses of network devices on private network 150, privacy manager 130 may use mapping data 310 to replace all instances of "R2D2-Y-001.dcnip.tatooine.com" with "tatooine-1", all instances of "10.19.144.227" with "10.0.0.0" and so forth to hide the actual hostnames and IP addresses in the transformed output file. The transformed output file may also include non-sensitive information, such as serial numbers, OS versions, or other non-configurable device attributes, which are not replaced by dummy data in the transformed output file.

In step 414, privacy manager 130 posts a message to notify collection system 140 that the output file has been transformed. In step 416, collection system 140 receives the message.

In step 418, collection system 140 reads the transformed output file. In one embodiment, collection system 140 deletes the original output file that includes the sensitive information after the transformed file has been read. Alternatively, collection system 140 may maintain the original output file, but does not send the original output file to support server 180.

In step 420, collection system 140 sends the transformed output file to support server 180. In one embodiment, collection system 140 encrypts the transformed output file before sending it to support server 180. Alternatively, collection system 140 sends the transformed output file without encrypting the data. Even if the transformed output file is not encrypted, the sensitive information is hidden from support server 180 because support server 180 does not have access to the mapping data 310, which is maintained by privacy manager 130 within private network 150.

In step 422, collection system 140 posts a message to notify privacy manager 130 that the transformed output file has been sent. In step 424, privacy manager 130 receives the message notification that the transformed output file has been sent. In step 426, privacy manager 130 deletes the transformed output file. Alternatively, privacy manager 130 may maintain the transformed output file for subsequent use.

Support server 180 may also aggregate collected data across multiple data centers that belong to a single customer. For example, a first collection system may collect information from devices in a first customer data center, a second collection system may collect information from devices in a second customer data center, and so forth. Each collector may be configured to hide sensitive information according to the techniques described above and send the output file to support server 180. Support server 180 may aggregate the collected data identified by the output files into a single report for the customer.

3.3 Remapping Sensitive Information

After collection system 140 has uploaded the transformed output file, support server 180 analyzes the network information included in the transformed output file and generates reports to notify the user of any issues with the network.

The reports that are generated by support server 180 may vary from implementation to implementation. In one embodiment, the reports comprise inventory reports that identify network inventory with private network 150. For example, the inventory report may identify the serial number, hostname, IP address, and other device attributes for network devices 110A to 110N.

In another embodiment, support server 180 generates product alert reports. For example, support server 180 may analyze the OS version or other software configurations and generate reports notifications to notify the user when updates are available. The product alert reports may also include notifications if a network device is out of warranty or will not be supported by a vendor in the future. In another example, the product alert reports may include security alerts to notify the user of any security issues related to a network device.

In another embodiment, support server 180 generates contract-related reports. For example, support server 180 may compare a serial numbers included in the transformed output file with serial numbers included in contracts to determine when a contract associated with the device might expire. The contract-related report may notify the user if the contract will expire within a threshold time period or has already expired.

In another embodiment, support server 180 generates delta reports. Delta reports indicate changes from a previous report and may be applied to inventory reports, product alert reports, or contract-related reports. For instance, a delta report may notify the user of any changes in network inventory, product updates, or contract status changes since the last inventory, product alert, or contract-related report.

Because the support server 180 does not have access to the sensitive device attributes, the reports generated by support server 180 include dummy information in place of the sensitive information. For example, a product alert report may include the false hostname and/or IP address for the device to which the alert notification pertains.

Figure 5:
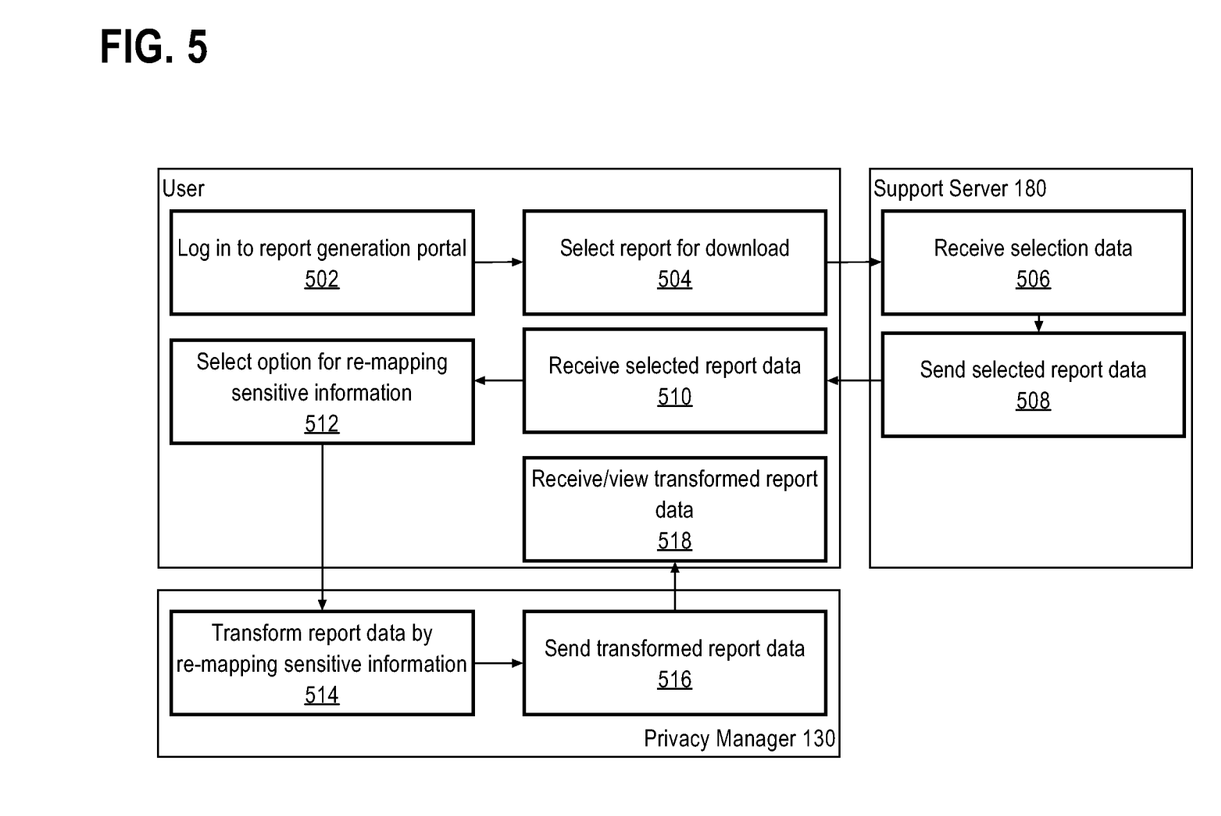
FIG. 5 illustrates an approach for remapping sensitive information in accordance with an embodiment.

In one embodiment, privacy manager 130 remaps sensitive information into the reports downloaded by the user. FIG. 5 illustrates an approach for remapping sensitive information in accordance with an embodiment. In step 502, the user logs in to a report generation portal to access the reports generated by support server 180. The user may access the reports using any of network devices 110A to 110N.

In step 504, the user selects a report for download. For instance, the user may select to download an inventory report, product alert report, or contract-related report from support server 180.

In step 506, support server 180 receives the selection data. In response, support server 180 sends the selected report data to the user in step 508.

In step 510, the user receives the selected report data via a network device in private network 150. Accordingly, the report data is within the domain of private network 150, and the sensitive information may be remapped into the reports.

In step 512, the user selects an option to remap the sensitive information into the report. In one embodiment, a button or other user-interface element is presented to the user, which the user may click on or otherwise select to remap the sensitive information. Alternatively, the sensitive information may automatically be remapped when the report is downloaded onto the user's machine or when the user opens the report.

In step 514, privacy manager 130 transforms the report data by re-mapping the sensitive information into the report. For example, privacy manager 130 may use mapping data 310 to replace all instances of "tatooine-1" with "R2D2-Y-001.dcnip.tatooine.com", all instances of "22.27.61.227" with "10.0.0.0" and so forth to reintegrate the sensitive information into the report.

In step 516, privacy manager 130 sends the updated report data to the network device of the user. Alternatively, privacy manager 130 may execute locally on the network device of the user, and the updating of the report data occurs as a local process without invoking another network device.

In step 518, the user receives the transformed report data from the privacy manager. The user may now view the reports without the dummy data and with the sensitive information mapped to the correct place in the report.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
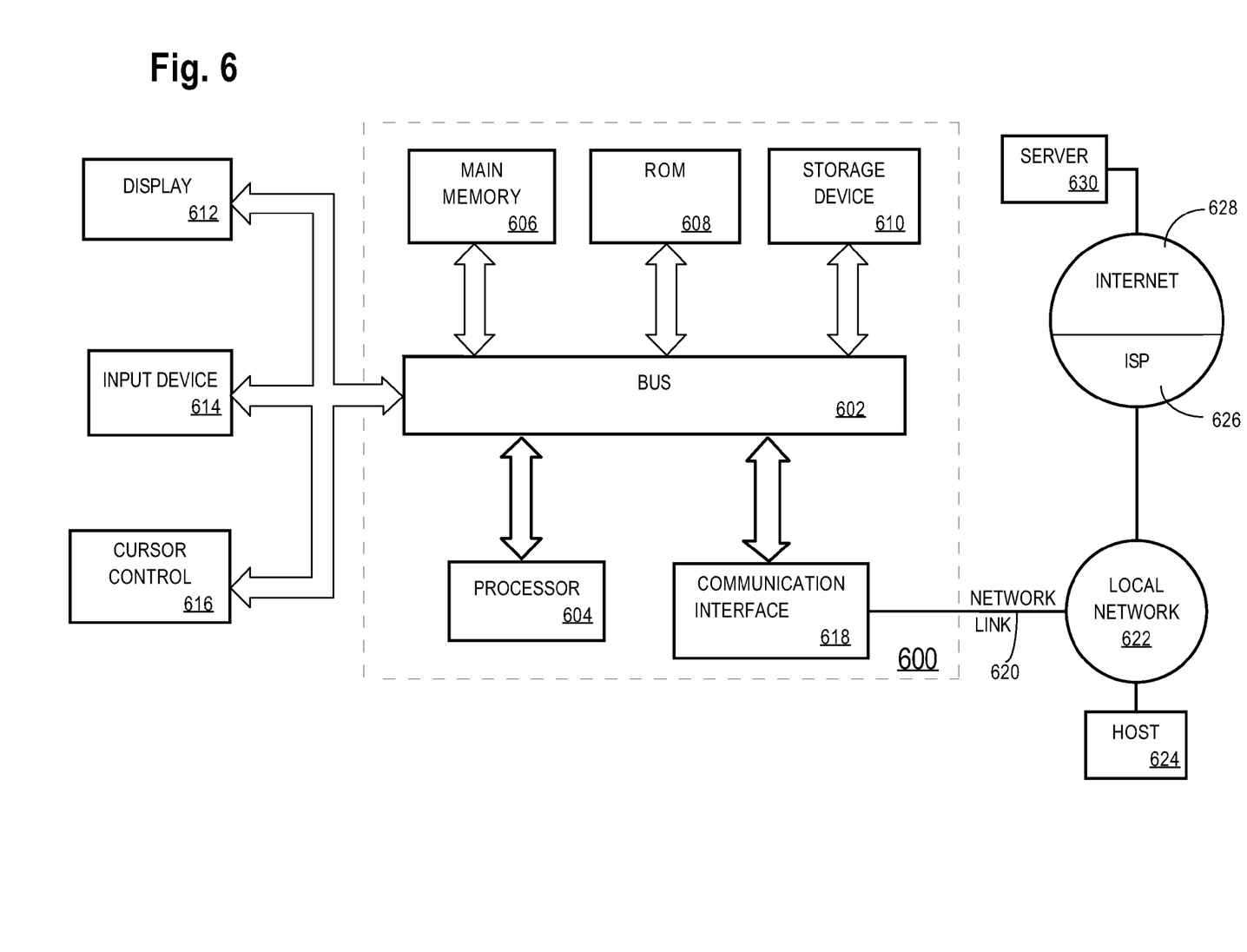
FIG. 6 illustrates a computer system upon which an embodiment may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), liquid crystal display (LCD), or light emitting diode (LED or OLED) display, for displaying information to a computer user. An input device 614, including alphanumeric input such as keys, is coupled to bus 602 for communicating information and command selections to processor 604. Another type of user input device is cursor control 616, such as a mouse, a trackball, an accelerometer, or cursor direction keys or sensors for communicating direction information and command selections to processor 604 and for controlling cursor movement on display 612. Input device 614 and cursor control 616 may be implemented on a touchscreen mechanism commonly attached to smartphones and other mobile devices. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    determining, at a first network device, that network device information collected from a particular network device includes first non-sensitive data and sensitive data;
    in response to the determining, generating mapping data that maps dummy data to the sensitive data;
    generating first output data that comprises the first non-sensitive data and the dummy data;
    sending the first output data to a second network device;
    receiving a first report file, from the second network device, that includes first support information for the particular network device and the dummy data;
    based on the mapping data, replacing, at the first network device, the dummy data in the report file with the sensitive data;
    after receiving the first report file, sending, to the second network device, second output data that comprises second non-sensitive data for the particular device, different than the first non-sensitive data, and the dummy data;
    receiving a second report file, from the second network device, that includes second support information, different than the first support information, and the dummy data;
    based on the mapping data, replacing, at the first network device, the dummy data in the second report file with the sensitive data.

2. The method of claim 1, wherein the network device information comprises data that identifies a network problem associated with a private network.

3. The method of claim 1, wherein the first non-sensitive data includes data that identifies a serial number for the particular network device; wherein the sensitive data comprises data that identifies a private internet protocol (IP) address of the particular network device on a private network.

4. The method of claim 1, further comprising: receiving user input that selects one or more network parameters that are sensitive; based on the one or more network parameters selected by the user, determining which of the network device information is the first non-sensitive data and which of the network device information is the sensitive data.

5. The method of claim 1, further comprising collecting the network device information from a plurality of network devices on a private network.

6. The method of claim 1, wherein the mapping data is maintained only by the first network device.

7. One or more non-transitory computer-readable storage media comprising one or more sequences of instructions which when executed cause:
    determining, at a first network device, that network device information collected from a particular network device includes first non-sensitive data and sensitive data;
    in response to the determining, generating mapping data that maps dummy data to the sensitive data;
    generating first output data that comprises the first non-sensitive data and the dummy data;
    sending the first output data to a second network device;
    receiving a first report file, from the second network device, that includes first support information for the particular network device and the dummy data;
    based on the mapping data, replacing, at the first network device, the dummy data in the report file with the sensitive data;
    after receiving the first report file, sending, to the second network device, second output data that comprises second non-sensitive data for the particular device, different than the first non-sensitive data, and the dummy data;
    receiving a second report file, from the second network device, that includes second support information, different than the first support information, and the dummy data;
    based on the mapping data, replacing, at the first network device, the dummy data in the second report file with the sensitive data.

8. The one or more non-transitory computer-readable storage media of claim 7, wherein the network device information comprises information that identifies a network problem associated with a private network.

9. The one or more non-transitory computer-readable storage media of claim 7, wherein the first non-sensitive data includes a serial number for the particular network device; wherein the sensitive data comprises a private internet protocol (IP) address of the particular network device on a private network.

10. The one or more non-transitory computer-readable storage media of claim 7, further comprising instructions which when executed cause: receiving user input that selects one or more network parameters that are sensitive; based on the one or more network parameters selected by the user, determining which of the network device information is the first non-sensitive data and which of the network device information is the sensitive data.

11. The one or more non-transitory computer-readable storage media of claim 7, further comprising instructions which when executed cause: collecting the network device information from a plurality of network devices on a private network.

12. The one or more non-transitory computer-readable storage media of claim 7, wherein the mapping data is maintained only by the first network device.

13. A method comprising:
receiving, through a user interface for a network collector, input that identifies one or more sensitive network parameters that should not leave a private network and that are collected by the network collector;
periodically collecting, by the network collector, network data from one or more network devices that are in the private network;
based on the input, determining which of the collected network data is sensitive network data;
in response to the determining, generating mapping data that maps dummy data to the sensitive network data;
replacing the sensitive data with the dummy data;
periodically generating, by the network collector, output files that include at least a portion of the collected network data and the dummy data;
sending the output file over a public network to a second network device for a network analysis of the one or more network devices in the private network;
receiving a report file from the second network device, the report file including the dummy data;
wherein the report file identifies network issues associated with the one or more network devices in the private network;
wherein the dummy data serves as a placeholder for the sensitive network data in the report file;
replacing, at a first network device, the dummy data in the report file with the sensitive network data.

14. The method of claim 13, wherein the at least one output file includes non-sensitive network data and the sensitive network data; wherein the non-sensitive network data includes collected non-configurable device attributes of the one or more network devices in the private network; wherein the sensitive network data includes user-configurable device attributes of the one or more network devices in the private network.

15. The method of claim 13, wherein the sensitive network data includes actual device hostnames of the one or more network devices in the private network; wherein generating the dummy data comprises: mapping each actual device hostname of the one or more network devices to a false device hostname.

16. One or more non-transitory computer-readable storage media comprising one or more sequences of instructions which when executed cause:
receiving, through a user interface for a network collector in a private network, input that identifies one or more sensitive network parameters that should not leave the private network and that are collected by the network collector;
periodically collecting, by the network collector, network data from one or more network devices that are in the private network;
based on the input, determining which of the collected network data is sensitive network data;
in response to the determining, generating mapping data that maps dummy data to the sensitive network data;
replacing the sensitive data with the dummy data;
periodically generating, by the network collector, output files that include at least a portion of the collected network data and the dummy data;
sending at least one output file of the periodically generated output files over a public network to a second network device for a network analysis of the one or more network devices in the private network;
receiving a report file from the second network device, the report file including the dummy data;
wherein the report file identifies network issues associated with the one or more network devices in the private network;
wherein the dummy data serves as a placeholder for the sensitive network data in the report file;
replacing, at a first network device, the dummy data in the report file with the sensitive network data.

17. The one or more non-transitory computer-readable storage claim 16, wherein the at least one output file includes non-sensitive network data and the sensitive network data; wherein the non-sensitive network data includes collected non-configurable device attributes of the one or more network devices in the private network; wherein the sensitive network data includes user-configurable device attributes of the one or more network devices in the private network.

18. The one or more non-transitory computer-readable storage media of claim 16, wherein the sensitive network data includes actual device hostnames of the one or more network devices in the private network; wherein generating the dummy data comprises: mapping each actual device hostname of the one or more network devices to a false device hostname.

* * * * *